G. L. LARSON.
SAFETY NUT
APPLICATION FILED MAR. 1, 1921.

1,421,090.

Patented June 27, 1922.

Inventor
G. L. Larson,
By Marks & Clerk
Attys.

UNITED STATES PATENT OFFICE.

GUSTAV LAURITS LARSON, OF LYNGDAL, NEAR FARSUND, NORWAY.

SAFETY NUT.

1,421,090. Specification of Letters Patent. Patented June 27, 1922.

Application filed March 1, 1921. Serial No. 448,786.

*To all whom it may concern:*

Be it known that I, GUSTAV LAURITS LARSON, citizen of Norway, residing at Tjersland, Lyngdal, near Farsund, Norway, have invented certain new and useful Improvements in Safety-Nuts, of which the following is a specification.

The present invention relates to a safety-nut, which mainly is characterized in this, that the bottom of the thread of the bolt belonging thereto is equipped with grooves into which a tooth or nose of a pawl, which is turnably arranged in the nut, may be brought to catch, so that the nut may be drawn tight without hindrance, whereagainst a loosening of the same only can take place after that the pawl has been brought out of catch.

To facilitate the screwing the pawl tooth is preferably formed with a V-shaped point and the teeth which are formed by the aforesaid grooves are suitably splitted, so that the pawl tooth easily may slide over when the nut is drawn tight.

The invention is illustrated in the accompanying drawing, in which:

Figure 1 shows a section through a nut with a threaded bolt placed therein.

The section is through the nut thus laid, that the pawl mechanism is lying uncovered, whereas the section through the bolt is taken along the bottom of a thread.

Figure 1:
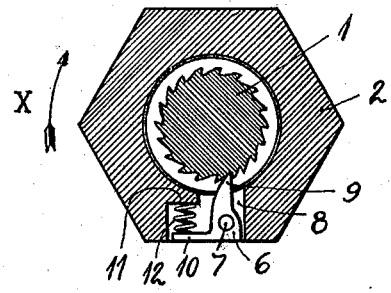
Figure 2:
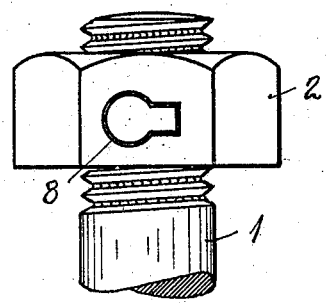
Figure 2 shows a screw with the nut and the pawl mechanism seen from the outside.

In the drawing 1 denotes the threaded bolt and 2 denotes the nut. The thread of the bolt is formed like a pawl wheel, the bottom of the thread being equipped with grooves 3, with intermediate teeth 4, to a depth which corresponds with the thread of the nut. These teeth are pointed outwardly and are inclined in relation to the radius of the bolt as in common pawl wheels. The front sides of the teeth are undercut so that the intermeshing of the lock tooth in the locking position is secured.

Figure 3:
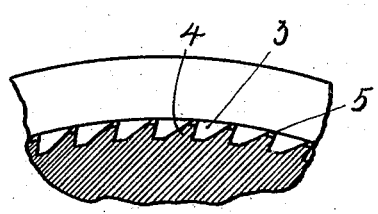
Figure 3 shows in section and on a greater scale a portion of the threaded bolt with the splitted locking teeth at the bottom of the thread.
Figure 4:
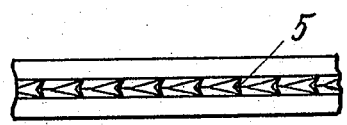
Figure 4 shows a portion of a single thread seen from the side and on a greater scale.

To facilitate the screwing, the teeth are—as will be seen from the Figures 3 and 4—at the point formed with V-shaped slots 5, so that a correspondingly formed locking tooth easily will slide through when the teeth of the bolt are passed.

6 is the pawl which is supported upon a pin 7 in a cavity 8 in the side of the nut. The pawl 6 has on the side facing the bolt a V-shaped tooth 9. 10 is a plane elongation of the pawl 6. Between this and a corresponding projection 11 at the side of the cavity 8 facing the bolt 1, a pressure spring 12 is arranged, which tends to keep the locking tooth 9 in intermeshing position.

When the nut is moved in the direction of the arrow X, that is, when the nut is drawn tight, the locking pawl will slide over the teeth 4, whereas a movement into the opposite direction can not take place unless the arm 10 is pressed inward against the action of the spring 12.

It should be noted that the outer side of the pawl 6 with the elongation 10 normally, when the locking tooth catches into a groove 3, will be flush with the outer side of the nut, so that drawbacks on account of projecting parts are avoided.

Having now particularly described and ascertained the nature of my said invention and in what manner the same is to be performed, I declare that what I claim is:—

1. A device of the character described comprising a bolt having screw threads, teeth formed at the bottom of said threads having slotted points, a nut fitted on the screw threads of the bolt, and a pivoted locking member carried by the nut engageable with the teeth to prevent retrograde rotation of the nut, the slotted portions of said teeth facilitating movement of the locking member thereover during retrograde movement of the nut.

2. A device of the character described comprising a bolt provided with screw threads, ratchet teeth formed at the bottom of said threads having slotted points, a nut fitted on the screw threads of said bolt, a spring actuated locking member pivotally mounted in the nut adapted for adjustment externally thereof and having an inwardly projecting portion coacting with the ratchet teeth whereby to prevent retrograde rotation of said nut, the slotted extremities of said ratchet teeth facilitating movement of the locking member over the ratchet teeth during removal of the nut.

In testimony whereof I affix my signature.

GUSTAV LAURITS LARSON.